3,356,483
METHOD FOR PLANT GROWTH ALTERING

John K. Leasure, Midland, and Dorsey R. Mussell, Clare, Mich., assignors to The Dow Chemical Company, Midland, Mich., a corporation of Delaware
No Drawing. Filed Sept. 10, 1963, Ser. No. 307,775
6 Claims. (Cl. 71—66)

This application is a continuation-in-part of copending application Serial No. 189,991, filed April 25, 1962, now abandoned.

This invention is concerned with the regulation of the growth of plant organisms and is particularly directed to compositions and methods for modifying and altering the growth of plants and plant parts.

It is an object of the present invention to provide a novel method for modifying and altering the growth characteristics of plants and plant parts. Another object is to provide a novel method for the suppression and control of the growth of undesired vegetation as, for example, for the inhibition of the growth and the killing of plants and plant parts. A further object is the provision of a method for the suppression of the growth of seeds, emerging seedlings, and established vegetation. Still another is to provide a novel method for the control and inhibition of the growth of fungal plants. A further object is to provide an improved method for the maturing of crops and for stimulating and increasing the growth rate of vegetation as, for example, for stimulating the growth rate of seedlings newly germinated from seeds; for hastening the ripening of fruit, vegetable crops and grain crops; for increasing the dry weight yield of crop plants prior to harvesting; and for bringing about the earlier and more abundant production of flowers.

According to the present invention, it has been discovered that the growth characteristics of plants and plant parts are modified or altered by exposing plants and plant parts to the action of, or by treating plants and plant parts and their habitats with a dinitro compound selected from

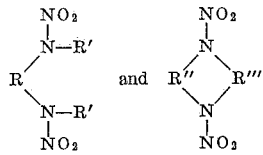

wherein R represents an alkylene group containing not in excess of 10 carbon atoms; R' represents hydrogen, lower alkyl, alkali metal, or lower alkoxycarbonyl; R" represents an alkylene group containing not in excess of 3 carbon atoms; and R''' represents carbonyl, methylene, alkaline earth metal, or a divalent heavy metal.

In the present specification and claims, the expressions "lower alkyl" and "lower alkoxy" refer to radicals containing from 1 to 4, inclusive, carbon atoms; the expression "alkali metal" is inclusive of ammonium; the term divalent heavy metal is employed to refer to manganese, iron, cobalt, nickel, copper, zinc, cadmium, tin, mercury, and lead; and the term alkaline earth metal is employed to refer to those members of the 11A group of the periodic table which are of an atomic weight of up to and including 150.

Illustrative of the compounds to be employed according to the present invention are N,N'-dinitroethylenediamine, N,N'-cyclic nickel derivative; N,N'-dinitro-1,4-butanediamine, N,N'-dipotassium derivative; dipentyl hexamethylenebis(nitrocarbamate); N,N'-dinitroethylenediamine, N,N'-cyclic cobalt derivative; N,N'-diethyl-N,N' - dinitroethylenediamine; N,N' - dinitro-1,2-propanediamine, N,N'-cyclic lead derivative; 1,3-dinitro-2-imidazolidinone; N,N'-dinitroethylenediamine, N,N'-cyclic zinc derivative; N,N'-dibutyl-N,N'-dinitro-1,6-hexanediamine; N,N' - dinitromethanediamine; N,N' - dinitroethylenediamine, N,N'-dilithium derivative; diethyl decamethylenebis (nitrocarbamate); N,N' - dinitroethylenediamine, N,N'-cyclic tin derivative; dimethyl nonamethylenebis(nitrocarbamate); $N^1,N^2$ - dinitro - 1,2-propanediamine, $N^1,N^2$-diammonium derivative; N,N'-dinitro-1,8-octanediamine; N,N'-dinitroethylenediamine, N,N'-cyclic cadmium derivtive; 1,3-dinitroimidazolidine; N,N'-dinitro-1,2-propanediamine, N,N'-cyclic mercury derivative; diethyl pentamethylenebis(nitrocarbamate); N,N' - dinitroethylenediamine, N,N'-disodium derivative; N,N'-dinitroethylenediamine, N,N'-cyclic manganese derivative; hexahydro-1,3-dinitropyrimidine; tetrahydro-1,3-dinitro-2(1H)-pyrimidinone; N,N'-dinitroethylenediamine, N,N'-cyclic copper derivative; 4-methyl-1,3-dinitro-2-imidazolidinone; N,N'-dinitroethylenediamine, N,N'-cyclic calcium derivative; N,N' - dinitro-2,3-butanediamine; N,N'-dinitroethylenediamine, N,N'-cyclic magnesium derivative; dimethyl hexamethylenebis(nitrocarbamate); and N,N'-dinitroethylenediamine, N,N'-cyclic iron derivative; N,N'-dinitro-1,2-propanediamine, N,N'-cyclic beryllium derivative; N,N'-dinitroethylenediamine, N,N'-cyclic barium derivative; and N,N'-dinitro-1,2-propanediamine, N,N'-cyclic strontium derivative.

More particularly, it has been discovered that the growth of pests such as fungi, seeds, emerging seedlings and established aquatic or terrestrial vegetation can be suppressed and inhibited by exposing fungi, seeds, seedlings or the roots or above-ground portions of the vegetation to the action of a growth-inhibiting amount of the agents. It has further been discovered that certain of the agents are very toxic to fungal plants and of a much lower toxicity to terrestrial plants and their seeds, and are adapted to be distributed in soil, or applied to seeds or the above-ground portions of plants. Such practice protects the plants, plant roots, and seeds from the attack of fungi and improves the emergence of seedlings as well as the crop yield without injury to the seed, crop plant or plant part. Additionally, it has been discovered that with proper selection of active agent and control of dosage, the growth of plants can be stimulated, or the maturing of crop plants facilitated and the harvest promoted without substantial injury to the plant or that portion of the plant to be harvested. Thus, they are adapted to be employed to stimulate the growth and improve the yield of crops, to stimulate the germination of seeds, to hasten the maturing and ripening of grain, vegetable and fruit crops, to increase the flowering and fruit set, and to increase the dry weight yield of crop plants. It has also been discovered that the seeds maturing from certain treated herbaceous plants produce plants maintaining the improved growth and yield.

Additionally, the compounds can be applied in dormant applications to the woody surfaces of terrestrial plants or to orchard floor surfaces to obtain excellent controls of the overwintering spores of fungi.

In further operations, the compounds can be included in inks, adhesives, soaps, high energy fuels, cutting oils, polymeric materials or in oil or latex paints to prevent mold and mildew, and the degradation of such products resulting from microbial attack. Also, the compounds can be distributed in textiles or cellulosic materials, or can be employed in the impregnation of wood and lumber to preserve and protect such products from the attack of the microbial agents of rot, mold, mildew and decay. The foregoing environments are merely illustrative of the many habitats in which these agents can be distributed to obtain excellent growth regulation.

The active agents to be employed in accordance with the present teachings are liquid or solid materials which are somewhat soluble in many common organic solvents and of varying solubility in water. Thus, the alkali metal products, such as the sodium, potassium and ammonium products, are soluble in water while the remaining materials are of low solubility in water. They are readily and conveniently adapted to be distributed in the water environing aquatic plants, to be distributed in the soil or on the above-ground portions of terrestrial plants, or to be incorporated in inks, adhesives, detergents, cutting oils, high energy fuels, paints, textiles, polymeric materials, paper or wood and wood products. It is an advantage of the present invention, that with proper selection of agent and dosage, substantially complete controls of a wide range of fungal plant species can be obtained at very small dosages of active agent. It is a further advantage that such controls can be obtained without injury to desirable crop species. It is an additional advantage that a single application of the compounds to the foliage of plants gives a residual and extended control of fungal pests over a prolonged period. Another advantage resides in the ability of the agents, with proper selection, to stimulate plant growth and to mature the harvest of crop plants. Thus, with proper selection, a single application can be employed to obtain the advantage of substantially complete kills of fungal organisms together with the very desirable improvement in yield resulting from improved plant growth.

The exposure of a viable form of plants, or of plants and plant parts, to the action of the active agents gives rise to varying responses depending upon the nature of the plants or plant parts, the stage of growth or maturity of the plant, the active agent employed and the dosage of active agent at which the exposure is carried out. When large dosages are dispersed in growth media, a persistent inhibition of the growth of fungal plants, seeds, emerging seedlings and established vegetation is obtained. The weathering action of the sun, rain and possibly the decomposition of the agents by the action of soil organisms, eventually reduces their concentration in growth media. The application of large dosages to the foliage of vegetation suppresses the growth of narrow and broad leafed plant species as well as the fungal organisms infesting the same. Seed, soil or foliar applications of more dilute dosages of certain of the compounds give excellent control of fungal plants which attack seeds, or the roots or foliage of crop plants without injury to the seeds, roots or foliage of the plants. These compounds are the dinitroalkylenediamines containing an alkylene group having at least 5 carbon atoms, or containing lower alkoxycarbonyl moieties. Such compounds are hereinafter referred to as the A-type compounds. The compounds employed in accordance with the present teachings and falling outside of the definition of A-type compounds are hereinafter referred to as B-type compounds. The application of lesser amounts of B-type compounds to plants and plant parts alters the growth of the plants and plant parts such as stimulating the growth and improving the harvest and yield, or maturing the crop for harvest or subsequent to harvest depending upon the time of application. Where plant yield is concerned, the compounds are employed during the seedling stage, while for the maturing of the crop, the compounds are employed toward the end of the normal growing season or subsequent to harvest. Additionally, 1,3-dinitro-2-imidazolidinone and tetrahydro-1,3-dinitro-2(1H)-pyrimidinone are of high toxicity to fungal organisms and can be employed to obtain the advantage of fungal control together with the alteration and improvement in the growth of crop plants.

The treatment of plants and plant parts and their habitats with amounts of the agents effective to modify and alter the growth of plants and plant parts is essential and critical for the practice of the present invention. In non-selective applications to plants and plant parts and their habitats, the active agents are employed in plant growth inhibiting and plant killing dosages. In such operations, good results are obtained when the plants and plant parts and their habitats are exposed to dosages of from about 20 or less to 300 pounds or more per acre. In soil, good results are obtained when the compounds are distributed therein in the amount of from 20 to 300 or more parts per million parts by weight of soil. In selective applications for the control of fungal plants on the above-ground portions of crop plants, the A-type compounds are employed in amounts of from .003 to 25 pounds per acre to obtain excellent results without substantial injury to the crop plants. In such operations, liquid compositions containing from 3 to 5,000 parts per million conveniently can be applied to crop plant foliage to the point of run-off. Where the A-type compounds are to be employed as seed protectants, good results are obtained when the seeds are treated with from 1 to 4.6 ounces per 100 pounds of seed. In selective applications to soil for the control of root-attacking fungi, the A-type compounds are supplied in the soil in the amount of from about 10 to 50 parts by weight per million parts by weight of soil.

In general operations in soil, the compounds are distributed in the soil at a dosage of at least 0.5 part by weight per million parts of soil. In field applications, it is usually preferred that the compounds be distributed to a depth of at least 2 inches below the soil surface. Oftentimes it is desirable to distribute the compounds to a depth of 2 feet to avoid reinfestation of the soil from deep-dwelling fungal organisms. In applications to the furrow seed rows for the suppression of seedling diseases attributable to fungal organisms, it is desirable that the A-type compounds be distributed upon the surfaces of the furrow at a dosage of at least 0.1 pound per furrow soil surface in one planted acre. After such treatment, the furrow is seeded and the soil compacted about the seeds according to conventional practice. In the row treatment of existing vegetation, the products can be employed in known side dressing techniques.

Where the stimulation of plant growth, the improvement in plant yield and the maturing of the crop are concerned, the B-type compounds are employed in growth stimulating and plant maturing amounts. In such operations, good results are obtained when the compounds are applied to plants and plant parts at dosages of from 0.001 or less to 20 or more pounds per acre. In such operations, liquid compositions containing from about 1 to about 4,000 or more parts per million conveniently can be applied to the plant surfaces. In the treatment of seeds to stimulate seedling growth and obtain improved yields, good results are obtained when the seeds are treated with from 1 to 250 grams (about 0.035 to 9 ounces) of compound per hundred pounds of seed.

In the protection and preservation of inks, adhesives, cutting oils, high energy fuels, paints, textiles and paper, good results are obtained when the compounds are incorporated in such products in the amount of at least 0.0001 percent by weight. In the preservation of wood, excellent results are obtained when the compounds are incorporated by conventional treatment in the wood in the amount of at least 0.0001 pound per cubic foot of wood. In these protection and preservation treatments, it is preferred to employ the materials of high toxicity to fungal plants as the preservative agents.

The method of the present invention can be carried out by exposing the plants, plant parts, and their habitats to the action of the unmodified compounds. The present method also comprehends the employment of a liquid or dust composition containing one or more of the present compounds as an active component. In such usage, the active component is modified with one or a plurality of additaments or adjuvants for plant growth modification compositions such as water or other liquid carriers, surface-active dispersing agents and finely divided solids. Depending upon the concentration of active compound, such augmented compositions are adapted to be applied to plants, plant parts, and their habitats, or to be employed as concentrates and subsequently diluted with additional inert carrier to produce the ultimate treating compositions. In compositions where the adjuvant or helper is a finely divided solid, a surface-active agent, or the combination of a surface-active agent and a liquid additament, the carrier cooperates with the active component so as to facilitate the invention, and to obtain an improved and outstanding result.

In addition, the present method also comprehends the employment of aerosol compositions containing one or more of the present compounds as an active agent. Such compositions are prepared according to conventional methods wherein the agent is dispersed in a solvent and the resultant dispersion mixed with a propellant in liquid state. Such variables as the particular compound to be used and the particular substrate to be treated will determine the identity of the solvent and the concentration of the active compound. The solvent should be of low phytotoxicity such as water, acetone, isopropanol or 2-ethoxyethanol in compositions to be applied to plants for fungal control, the maturing of the crop or the improvement in yield and harvest.

The exact concentration of the active compound to be employed in the treating compositions is not critical and may vary considerably provided the required dosage of effective agent is supplied upon the plant, plant part and its habitat. The concentration of the active agent in liquid compositions employed to supply the desired dosage generally is from about 0.0001 to 50 percent by weight. Concentrations of up to 95 percent by weight are oftentimes conveniently employed. In dusts, the concentration of active component can be from about 0.01 to 20 percent by weight. In compositions to be employed as concentrates, the active component can be present in a concentration of from about 5 to 98 percent by weight.

The quantity of the composition applied is not critical provided only that the required dosage of active component is applied in sufficient of the finished composition to cover adequately the plant life or plant life habitat to be treated.

Liquid compositions containing the desired amount of active component can be obtained by dissolving the compound in an organic liquid carrier or by dispersing the active agent in water. With the water-insoluble agents, the dispersion is facilitated and conveniently accomplished with the aid of a suitable surface-active dispersing agent such as an ionic or non-ionic emulsifying agent. The aqueous compositions can contain one or more water-immiscible solvents for the active agent. In such compositions, the carrier can comprise an aqueous emulsion, that is, a mixture of water-immiscible solvents, emulsifying agent and water. The choice of dispersing and emulsifying agent and the amount thereof employed is dictated by the nature of the composition type and by the ability of the agent to facilitate the dispersion of the active agent in the carrier to produce the desired composition. Dispersing and emulsifying agents which can be employed in the compositions include the condensation products of alkylene oxides with phenols and organic acids, alkyl aryl sulfonates, polyoxyethylene derivatives of sorbitan esters, complex alcohols, mahogany soaps and the like.

In the preparation of dust compositions, the active component is dispersed in and on a finely divided solid which is non-reactive with the toxicants such as talc, chalk, gypsum and the like. In such operations, the finely divided carrier is mixed with the active compound or a volatile organic solvent solution thereof. Similarly, dust compositions containing the active compounds are prepared from various of the solid surface-active dispersing agents, such as bentonite, fuller's earth, attapulgite and other clays. Depending upon the proportion of ingredients, the dust compositions can be employed as concentrates and subsequently diluted with additional solid surface-active dispersing agent or with talc, chalk or gypsum and the like to obtain the desired amount of active component in compositions adapted to be employed for the modification of the growth characteristics of plants. Also, such concentrated dust compositions can be dispersed in water with or without the aid of a dispersing agent, to form spray mixtures. Preferred finely divided solid adjuvants include those which are of low phytotoxicity to plants and plant parts.

When operating in accordance with the present invention, the active agents or compositions containing the agents are applied to plants, plant parts, and their habitats in growth-altering amounts in any convenient fashion, for example, with power dusters, boom and hand sprayers and spray dusters. In alternative procedures, the agents or compositions containing the same are drilled into soil and further distributed therein in conventional procedures.

The following examples illustrate the invention but are not to be construed as limiting.

*Example 1*

Four parts by weight of diethyl hexamethylenebis (nitrocarbamate), 0.08 parts of sorbitan trioleate (Span 85) and 0.02 part of a sorbitan monolaurate polyoxyethylene derivative (Tween 80) are dispersed in 40 milliliters of acetone to produce a concentrate composition in the form of a water-dispersible liquid. A portion of this concentrate composition is dispersed in water to produce an aqueous spray composition containing 3 parts of the subject compound per million parts by weight of ultimate mixture. The resultant composition is sprayed with an atomizing spray nozzle using air pressure at 20 pounds per square inch on young tomato plants about 4 inches tall. The applications are carried out so as to give thorough coverage of all surfaces of the leaves of the plants without appreciable run-off. Following the applications, the spray compositions are allowed to dry upon the leaf surfaces and the plants then inoculated by spraying with a suspension of viable spores of *Phytophthora infestans* (tomato late blight). Untreated tomato plants of the same maturity are similarly inoculated to serve as checks. Immediately following the inoculation, all plants are placed in a moist chamber and maintained at about 70° F. under saturated humidity conditions for 24 hours. Thereafter, the plants are set aside under greenhouse conditions for 48 hours and observed for the development of the lesions of tomato late blight caused by the Phytophthora organisms to determine the percent control of this organism.

Observation three days following the inoculations show substantially complete controls of *Phytophthora infestans* on the plants sprayed with the composition containing diethyl hexamethylenebis(nitrocarbamate). At the time of the observations, the leaves of the untreated check plants are found to be heavily covered with lesions of *Phytophthora infestans*.

Example 2

Diisobutyl ethylenebis(nitrocarbamate), N,N'-dinitro-1,8-octanediamine, N,N'-dinitro-1,6-hexanediamine, dimethyl ethylenebis(nitrocarbamate), 1,3-dinitro-2-imidazolidinone, and diethyl ethylenebis(nitrocarbamate) are formulated in water with an alkyl aryl sulfonate (Nacconol NR) and a substituted benzoid alkyl sulfonic acid (Daxad No. 27) to produce aqueous spray compositions. In such operations, the materials are ballmilled together to produce compositions containing varying amounts of one of the active agents, 300 parts by weight of Nacconol NR and 300 parts by weight of Daxad No. 27 per million parts by weight of ultimate aqueous mixture.

Concentrate compositions are prepared containing diethyl pentamethylenebis(nitrocarbamate), diethyl octamethylenebis(nitrocarbamate), and tetrahydro-1,3-dinitro-2(1H)-pyrimidinone, exactly in the manner described in Example 1 and the concentrate compositions are thereafter dispersed in water to prepare aqueous spray compositions containing varying amounts of one of the active agents.

These aqueous spray compositions are employed in the manner as described in Example 1 for the control of the growth of *Phytophthora infestans*. Following the treating operations, observations are carried out at regular intervals to ascertain what control of the tomato late blight is obtained. The compositions employed and the results of the obesrvations three days following the applications are set forth in the following table.

| Test Compound | Parts Test Compound Per Million Parts Ultimate Spray Mixture | Percent Control of *Phytophthora infestans* |
|---|---|---|
| Diisobutyl ethylenebis(nitrocarbamate) | 75 | 98 |
| N,N'-dinitro-1,8-octanediamine | 300 | 80 |
| Diethyl pentamethylenebis (nitrocarbamate) | 75 | 100 |
| N,N'-dinitro-1,6-hexanediamine | 75 | 95 |
| Diethyl octamethylenebis(nitrocarbamate) | 300 | 99 |
| Dimethyl ethylenebis(nitrocarbamate) | 300 | 95 |
| 1,3-dinitro-2-imidazolidinone | 75 | 100 |
| Diethyl ethylenebis(nitrocarbamate) | 75 | 95 |
| Tetrahydro-1,3-dinitro-2(1H)-pyrimidinone | 75 | 90 |

During the observation period, no stimulative, or abnormal or adverse effect upon the growth of the tomato plants resulting from the treating operations is observed. At the time of the recorded observations, there is found a very heavy infestation of the organisms of tomato late blight upon the plants in the untreated check plots.

Example 3

A concentrate composition containing diethyl pentamethylenebis(nitrocarbamate) is prepared as described in Example 1 and the resulting concentrate dispersed in water to produce an aqueous spray composition containing 300 parts per million by weight of the subject compound. This composition is sprayed with an atomizing spray nozzle using air pressure at 20 pounds per square inch on stands of young cucumber plants. The applications are carried out so as to give thorough coverage of all surfaces of the leaves of the plants without appreciable run-off. Other groups of cucumber plants of the same maturity are left untreated to serve as checks.

Plants heavily infested with sporulating *Erysiphe chicoracearum* (powdery mildew of cucumber) are randomly placed among the treated plants, together with the untreated check plants. The placement of each of the heavily infested plants is such that there is a closely proximal relationship of each of the treated and untreated check plants to a heavily infested plant. Under these circumstances, air currents carry spores from the heavily infested plants to the test plants, thereby inoculating the test plants. All plants are maintained under conditions favorable to the growth of the mildew.

After two weeks, observations show a substantially complete control and kill of the fungus organisms on the treated plants, while there is a heavy and uniform infestation on the untreated check plants. The infestation on the untreated checks is found not substantially different from that to be found on the plants employed as the inoculating plants.

Example 4

Aqueous compositions containing 0.0215 and 0.0432 pound of N,N'-dinitroethylenediamine per 100 gallons of ultimate mixture are prepared in accordance with the ballmilling procedure described in Example 2.

These aqueous compositions are employed for the treatment of seed beds which have been prepared and seeded with spinach seeds and observations are made on the modification of the growth of the seeds and emerging seedlings. In the treating operations, the compositions are applied as a soil drench and at a rate of about 0.434 acre inch of aqueous composition per acre to supply substantially uniform dosages of about 2.5 and 5 pounds, respectively, of the subject compound per acre. These dosages correspond, respectively, to concentrations of about 4 and 8 parts by weight of the subject compound per million parts by weight of soil. Other seed beds similarly seeded with spinach are left untreated to serve as checks.

After about four weeks, the seed beds are examined to ascertain what modification of the growth of seeds and emerging seedlings has taken place. The treated plants are found to be in an abundant and vigorous state of growth. They are further found to be much superior in height and to have a higher average number of leaves and flowers. There is no evidence of abnormal growth patterns or structures. The average height of the plants in the treated and untreated plots is determined, the plants thereafter harvested at the ground line, and the average weight, average number of leaves and percent of plants in bloom determined for the treated and untreated plants. The results of these determinations are set forth in the following table:

| Pounds of N,N'-dinitro-ethylenediamine Per Acre | Average Plant Height in Centimeter | Average Fresh Plant Weight in Milligrams | Average Number of Leaves Per Plant | Percent of Plants in Flower |
|---|---|---|---|---|
| 5 | 12 | 833 | 9 | 67 |
| 2.5 | 11 | 800 | 8 | 67 |
| 0 | 4 | 67 | 3 | 0 |

Example 5

Aqueous compositions containing 50, 100 and 5,000 parts by weight, respectively, of N,N'-dinitroethylenediamine are prepared according to the ballmilling procedures of Example 2. Each of these compositions is applied to the foliage of stands of soybean plants of the age of about nine weeks. The treatments are carried out with conventional spraying equipment, the plants being sprayed to the point of run-off. Adjacent plots of soybean plants are left untreated to serve as checks.

The treated plants are found, at all stages of growth, to be of more vigorous and healthy appearance than the untreated plants. After eight weeks, the plants are harvested at the ground line, the average number of fruits, nodes and seeds, as well as the average of fresh and dry weight of the harvested plants, determined for the treated and check plots. The results of the observations and determinations are set forth in the following table:

| | Number of Parts of Test Compound Per Million Parts of Ultimate Treating Composition | | | |
|---|---|---|---|---|
| | 0 | 50 | 100 | 5,000 |
| Height in centimeters | 47.5 | 68.5 | 140.0 | 151.0 |
| Fresh weight of tops in grams | 8.6 | 8.9 | 13.4 | 13.2 |
| Dry weight of tops in grams | 1.9 | 1.9 | 3.0 | 3.2 |
| Number of nodes | 7.5 | 8.0 | 11.0 | 11.0 |
| Number of fruits | 8.0 | 10.0 | 13.5 | 17.5 |
| Number of seeds | 17.5 | 20.0 | 24.0 | 29.0 |

*Example 6*

Aqueous spray compositions containing various parts by weight of N,N'-dinitroethylenediamine are prepared in the ballmilling procedure as described in Example 2. This composition is introduced into each of several aqueous suspensions of *Chlorella vulgaris* (algae) so that the N,N'-dinitroethylenediamine is present in various concentrations. Other comparable aqueous suspensions of *Chlorella vulgaris* are left untreated to serve as checks. The resulting aqueous suspensions of *Chlorella vulgaris* are maintained and observed under favorable growing conditions. Observations carried out seven days after the treating operations show the increase in growth rate indicated at the treatment dosages set forth in the table below.

| Parts of N,N'-dinitroethylenediamine per million parts of suspension | Percent stimulation of growth based upon a growth rate of 100 percent for untreated check |
|---|---|
| 10 | 300 |
| 5 | 310 |
| 2 | 250 |

At the time of the observations, the Chlorella organisms in the check suspensions are found to be in abundant and vigorous growth.

*Example 7*

An aqueous spray composition containing 0.432 pound of N,N'-dinitroethylenediamine per 100 gallons of ultimate mixture is prepared in the manner as described in the ballmilling procedure in Example 2. This aqueous composition is employed for the treatment of soil and observations made of the control of the growth of seeds and emerging seedlings of wild oats, Japanese millet and radish. In these determinations, the composition is employed to treat seed beds which have been prepared and seeded with the named plant species. In the treating operations, the composition is applied as a soil drench and at a rate of about 0.434 acre inch of aqueous composition per acre to supply a uniform dosage of about 50 pounds of the active agent per acre. This dosage corresponds to a concentration of about 80 parts by weight of the active agent per million parts by weight of soil. Other adjacent seed beds similarly seeded with the named plant species are left untreated to serve as checks.

After about four weeks, the seed beds are examined to ascertain what control of the growth of seeds and emerging seedlings is obtained. The observations show that in the seed beds treated with the diamine compound, there are obtained substantially complete controls of the growth and kills of the seeds and emerging seedlings of radish, Japanese millet and wild oats. At the time of the observations, the untreated check beds are found to support abundant stands of vigorously growing plants of the named plant species.

*Example 8*

Liquid concentrate compositions are prepared from diethyl hexamethylenebis(nitrocarbomate) and diethyl octamethylenebis(nitrocarbamate) exactly in the manner as described in Example 1 and the compositions thereafter dispersed in water to produce aqueous compositions containing 0.26 pound of one of the active agents per 100 gallons of ultimate mixture.

Diethyl ethylenebis(nitrocarbamate), diethyl tetramethylenebis(nitrocarbamate), N,N'-dinitro-1,6-hexanediamine, N,N'-dinitro-1,8-octanediamine and dipropyl ethylenebis(nitrocarbamate) are employed in the ballmilling procedure as described in Example 2 to obtain aqueous compositions containing 0.26 pound of one of the active agents per 100 gallons of ultimate mixture.

These aqueous compositions are employed for the treatment of soil planted with the seeds of radish, wild oats and Japanese millet in the manner as described in the preceding example. In such operations, the compositions are applied to the seed beds at a rate of 0.434 acre inch of aqueous composition per acre to supply substantially uniform dosages of 30 pounds of one of the active agents per acre. This dosage corresponds to about 48 parts by weight of active agent per million parts by weight of soil. Observation of seed beds four weeks following the treating operations shows heavy stands of vigorously growing plants of radish, wild oats and Japanese millet. The stands in the treated beds are not found substantially to be different from the stands in the untreated check beds.

*Example 9*

Liquid compositions are prepared with N,N'-dinitro-1,3 - propanediamine, 1,3-dinitro-2-imidazolidinone, and 1,3 - dinitroimidazolidine, N,N'-dinitroethylenediamine, N,N'-cyclic zinc derivative in the ballmilling procedure as described in Example 2 and containing varying amounts of one of the active agents.

Also, aqueous concentrate compositions are prepared as described in Example 1 from N,N'-dinitroethylenediamine, N,N'-disodium derivative; tetrahydro-1,3-dinitro - 2(1H)-pyrimidinone– 4-methyl-1,3-dinitro-2-imidazolidinone; N,N' - dinitroethylenediamine, N,N' - diammonium derivative; N,N' - dinitroethylenediamine, N,N'-cyclic calcium derivative; N,N' - dinitroethylenediamine, N,N'-dilithium derivative; and the resulting concentrates dispersed in water to prepare aqueous compositions containing varying amounts of one of the active agents.

These aqueous compositions are employed for the treatment of seed beds of sandy loam soil of good nutrient content. Prior to the treatment, the soil is seeded with the seeds of peas and beans. In the treating operations, the compositions are applied to the soil areas as described in Example 7 at a substantially uniform rate of 0.434 acre inch of aqueous composition per acre to supply varying amounts of one of the compounds per acre and varying concentrations of one of the compounds in the soil. Other areas similarly seeded with the named plant species are left untreated to serve as checks. Following the treating operations, the seed beds are observed at regular intervals to ascertain any appreciable effects upon the germination of the seeds and the growth of the seedlings.

Two weeks following the treating operations, the average height of the plants above the ground line in the treated seed beds is measured and compared with the average height of the plants in the untreated seed beds. The results of the measurements together with the agents, concentrations and dosages at which they are employed are set forth in the following table:

| Test Compound | Concentration of Test Compound in Spray Mixture | Dosage of Test Compound | | Percent Greater Stem Elongation of Plants from Treated Soil than from Untreated Soil | |
|---|---|---|---|---|---|
| | | Pounds per acre | Parts per million by weight of soil | Peas | Beans |
| N,N'-dinitro-1,3-propanediamine | 0.0432 | 5 | 8 | 18 | 37 |
| N,N'-dinitroethylenediamine, N,N'-cyclic calcium derivative. | 0.0432 | 5 | 8 | 35 | 118 |
| | 0.0086 | 1 | 1.6 | 30 | 33 |
| 1,3-dinitro-2-imidazolidinone | 0.0432 | 5 | 8 | 35 | 64 |
| | 0.0086 | 1 | 1.6 | 30 | 32 |
| Tetrahydro-1,3-dinitro-2(1H)-pyrimidinone | 0.0432 | 5 | 8 | 31 | 71 |
| N,N'-dinitroethylenediamine, N,N'-disodium derivative. | 0.0432 | 5 | 8 | 39 | 52 |
| | 0.0086 | 1 | 1.6 | 18 | 10 |
| N,N'-dinitroethylenediamine, N,N'-diammonium derivative. | 0.0432 | 5 | 8 | 43 | 85 |
| | 0.0086 | 1 | 1.6 | 30 | 57 |
| 1,3-dinitroimidazolidine | 0.0432 | 5 | 8 | 16 | 28 |
| | 0.0086 | 1 | 1.6 | 12 | 39 |
| N,N'-dinitroethylenediamine, N,N'-dilithium derivative | 0.0086 | 1 | 1.6 | 33 | 75 |
| 4-methyl-1,3-dinitro-2-imidazolidinone | 0.0432 | 5 | 8 | 23 | 43 |
| | 0.0086 | 1 | 1.6 | 38 | 36 |
| N,N'-dinitroethylenediamine, N,N'-cyclic zinc derivative. | 0.0432 | 5 | 8 | 85 | 153 |
| | 0.0086 | 1 | 1.6 | 38 | 50 |

*Example 10*

Liquid compositions are prepared with N,N'-dinitroethylenediamine, N,N'-cyclic nickel derivative, and N,N'-dinitroethylenediamine, N,N'-cyclic copper derivative in the ballmilling procedure described in Example 2 and each containing an amount of one of the named active agents.

Also, aqueous concentrate compositions are prepared as described in Example 1 from N,N'-dinitroethylenediamine, N,N'-cyclic manganese derivative, and N,N'-dinitroethylenediamine, N,N'-cyclic cobalt derivative and the resulting concentrates dispersed in water to prepare aqueous compositions each containing an amount of one of the named active agents.

In procedures essentially identical with those employed in Example 9, these aqueous compositions are employed for the plant growth modification of bean plants. The results of the measurements and the agents, concentrations, and dosages at which they are employed are set forth in the following table:

to produce an intermediate N,N'-bis(alkoxycarbonyl) alkylenediamine. The intermediate product is thereafter nitrated with fuming nitric acid to give the N,N'-bis(alkoxycarbonyl)-N,N'-dinitroalkylenediamine compound.

The N,N'-bis(alkoxycarbonyl)-N,N'-dinitroalkylenediamine compound, as above prepared, can be reacted with ammonium hydroxide to replace the (alkoxycarbonyl) groups with ammonium groups and to thereby obtain the diammonium derivative of the N,N'-dinitroalkylenediamine. The resulting diammonium derivative can be acidified to obtain the N,N'-dinitroalkylenediamine compound. Treatment of the N,N'-dinitroalkylenediamine compound with an alkali metal hydroxide results in the production of the corresponding alkali metal derivative such as the N,N'-disodium derivative or the N,N'-dipotassium derivative.

The cyclic compounds containing a carbonyl moiety as employed in accordance with the present invention are prepared in known procedures by the nitration, as with fuming nitric acid, of the corresponding and old heterocycles such as the imidazolidinones and pyrimidinone. Other of the heterocyclic compounds, wherein R'''

| Text Compound | Concentration of Test Compound in Composition | Dosage of Test Compound | | Percent Greater Stem Elongation of Bean Plants from Treated Soil than from Untreated Soil |
|---|---|---|---|---|
| | | Pounds per acre | Parts per million by weight of soil | |
| N,N'-dinitroethylenediamine, N,N'-cyclic cobalt derivative | 0.0432 | 5 | 8 | 77 |
| N,N'-dinitroethylenediamine, N,N'-cyclic manganese derivative | 0.0432 | 5 | 8 | 100 |
| N,N'-dinitroethylenediamine, N,N'-cyclic nickel derivative. | 0.0432 | 5 | 8 | 110 |
| | 0.0086 | 1 | 1.6 | 32 |
| N,N'-dinitroethylenediamine, N,N'-cyclic copper derivative | 0.0086 | 1 | 1.6 | 25 |

The compounds employed in accordance with the present invention are prepared in known methods. In one such method, an alkylnediamine compound having the formula

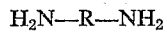

$$H_2N-R-NH_2$$

is reacted with a lower alkyl chloroformate having the formula

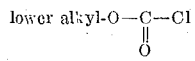

represents methylene, are prepared in known procedures whereby an appropriate N,N'-dinitroalkylenediamine compound, as previously defined, is reacted with aqueous formaldehyde to obtain an intermediate N-(hydroxymethyl)-N,N-dinitroalkylenediamine. The latter diamine cyclizes in the presence of a cyclizing agent, such as concentrated sulfuric acid, to yield the desired heterocyclic material.

The heterocyclic compounds, wherein R''' is an alkaline earth metal or a divalent heavy metal, are prepared in known metathetical procedures by reacting the N,N'-disodium derivative of the appropriate N,N'-dinitroalkylenediamine compound with an alkaline earth metal chloride or a heavy metal chloride. In an alternative procedure, when R''' is an alkaline earth metal, the compound can be prepared by reacting the appropriate N,N'-dinitroalkylenediamine with an alkaline earth metal oxide or hydroxide.

The N,N' - dialkyl-N,N'-dinitroalkylenediamine compounds, as herein employed, are prepared in known methods by alkylating the N,N'-dinitroalkylenediamine with a suitable dialkyl sulfate.

In the present specification and claims, the term "plant part" is intended to be inclusive of the spores, hyphae, mycelia, stems, branches, roots, root-like structures, foliage, flowers, fruit, and germinant seeds of plants.

What is claimed is:

1. The method which comprises applying to plants and plant parts and their habitats a growth-altering amount of a dinitro compound selected from the group consisting of

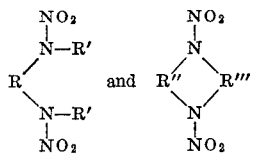

wherein R represents an alkylene group containing up to 10 carbon atoms, R' represents a member of the group consisting of hydrogen, lower alkyl, and alkali metal, R'' represents an alkylene group containing up to 3 carbon atoms, and R''' represents a member of the group consisting of carbonyl, methylene, alkaline earth metal, and divalent heavy metal.

2. The method claimed in claim 1 wherein the dinitro compound is employed together with an adjuvant as a carrier therefor.

3. The method of claim 1 wherein the dinitro compound is N,N'-dinitroethylenediamine.

4. The method of claim 1 wherein the dinitro compound is the N,N'-dialkali metal derivative of N,N'-dinitroethylenediamine.

5. The method which comprises applying to plants and plant parts and their habitats a growth-altering amount of tetrahydro-1,3-dinitro-2(1H)-pyrimidinone.

6. The method of claim 1 wherein the dinitro compound is of the formula

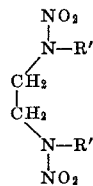

wherein R' is hydrogen, lower alkyl, or alkali metal.

References Cited

UNITED STATES PATENTS 3,264,083  8/1966  Davies et al. _____ 71—2.3

FOREIGN PATENTS 608,874  4/1962  Belgium.
918,882  2/1963  Great Britain.
935,671  9/1963  Great Britain.

OTHER REFERENCES

McKay et al.: J. Am. Chem. Soc., 70, 3990–3994 (1948).

McKay et al.: J. Am. Chem. Soc., 71, 1970–1973 (1949).

Bachmann et al.: J. Am. Chem. Soc., 72, 3132–3134 (1950).

LEWIS GOTTS, *Primary Examiner.*

JULIAN S. LEVITT, JAMES O. THOMAS, JR.,
*Examiners.*